UNITED STATES PATENT OFFICE.

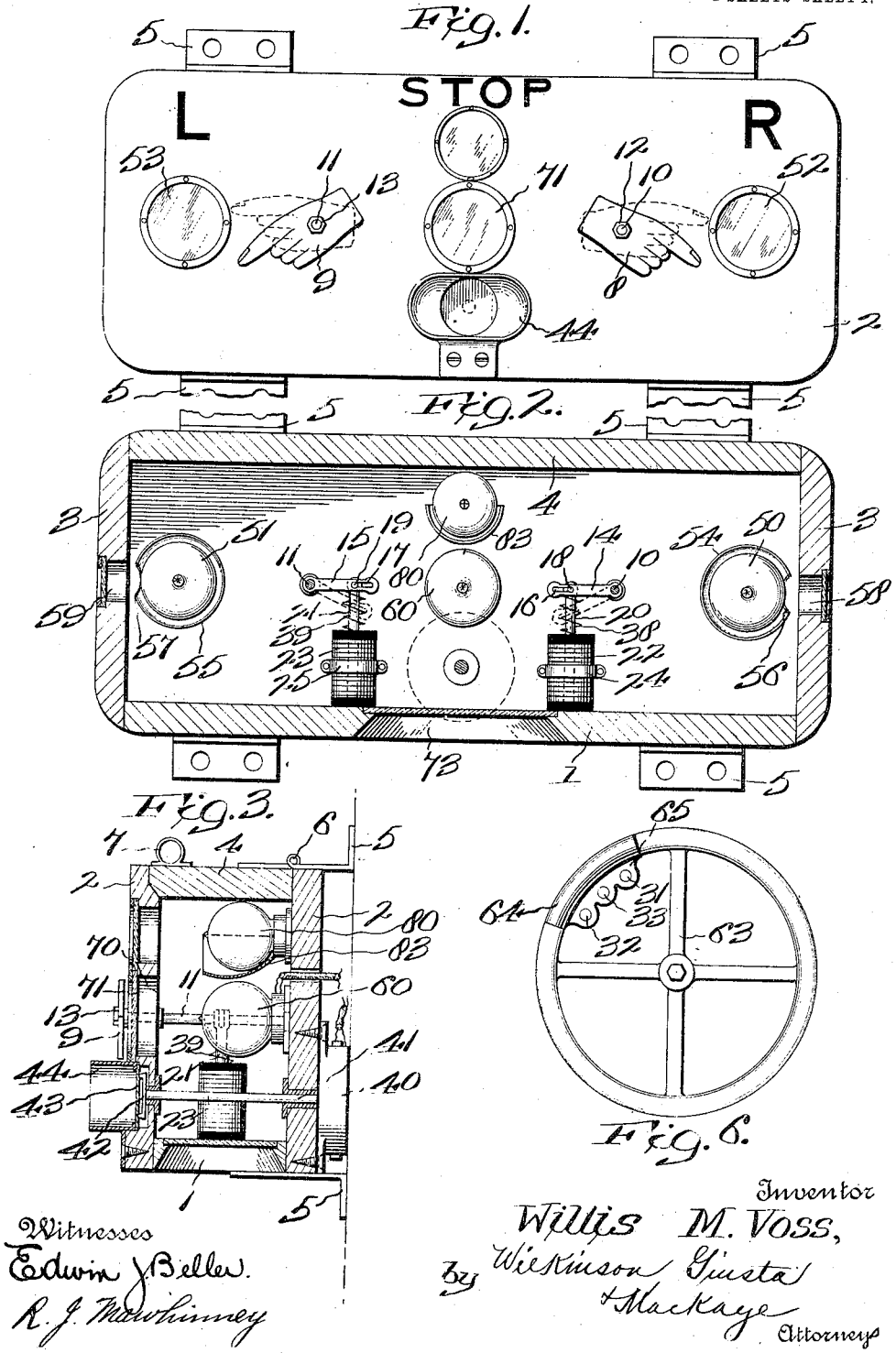

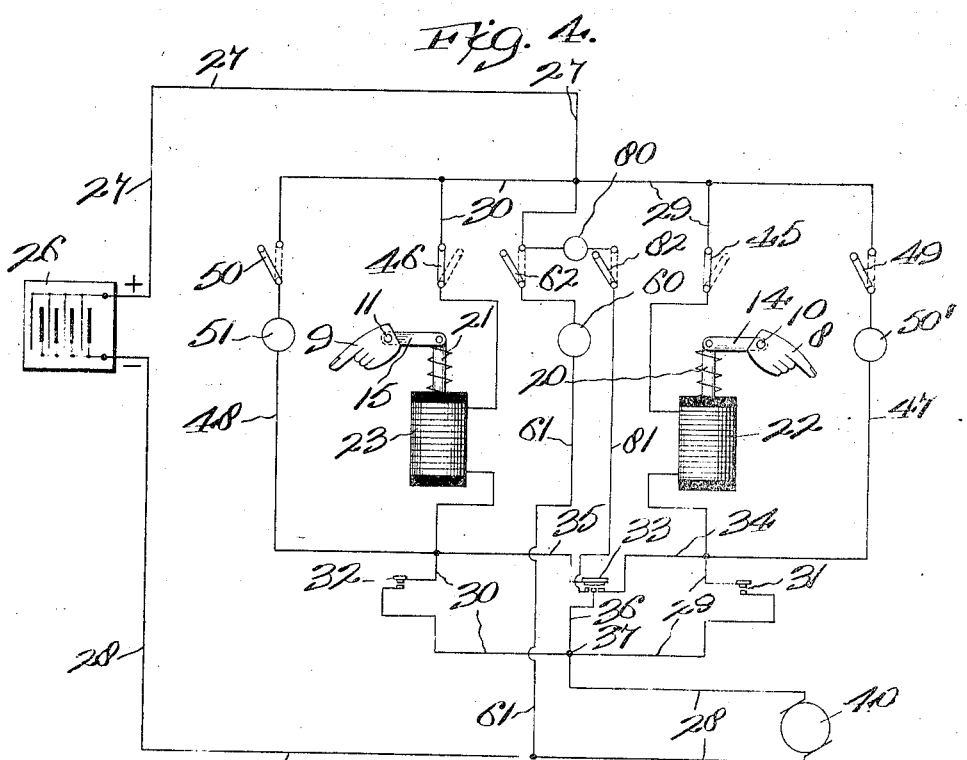

WILLIS M. VOSS, OF TAMPA, FLORIDA, ASSIGNOR OF ONE-HALF TO FREDERICK J. CORTINA, OF TAMPA, FLORIDA.

SIGNALING APPARATUS FOR VEHICLES.

1,121,424.

Specification of Letters Patent. Patented Dec. 15, 1914.

Application filed May 11, 1914. Serial No. 837,859.

*To all whom it may concern:*

Be it known that I, WILLIS M. VOSS, a citizen of the United States, residing at Tampa, in the county of Hillsboro and State of Florida, have invented certain new and useful Improvements in Signaling Apparatus for Vehicles; and I do hereby declare the following to be a full, clear, and exact description of the invention, such as will enable others skilled in the art to which it appertains to make and use the same.

The present invention relates to signaling apparatus for vehicles, and has for an object to provide a signaling apparatus for use on automobiles and the like for announcing to drivers of oncoming vehicles proposed changes in direction at cross streets and proposed stoppages with a view to reducing the liability of rear end collisions, and assisting drivers to maintain the distance of fifteen or twenty feet between vehicles now generally required by traffic ordinance.

It is another object of the invention to provide a signaling apparatus for vehicles in which a horn or other suitable audible signal may be sounded at each actuation of the annunciators so as to attract the attention of drivers at the time the signal is being displayed. Such an arrangement of audible signal renders it unnecessary for drivers to constantly maintain a watchful eye upon the signaling apparatus of preceding vehicles, thereby diverting their attention from other traffic and pedestrians, but calls their attention momentarily to the signal at the instant displayed.

A further object of the invention resides in providing a signaling apparatus for vehicles which will be operated from a convenient position by the driver, and which consists in a compact apparatus consisting of few and simple parts to which ready access may be had for purposes of repair and renewal.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a front elevational view of a signaling apparatus constructed in accordance with the present invention. Fig. 2 is a vertical sectional view of the same. Fig. 3 is a transverse sectional view of the same. Fig. 4 is a diagram of the system of circuits employed to actuate the various devices of the apparatus. Fig. 5 is an elevational view of the apparatus shown applied to a vehicle indicated in dotted lines; and Fig. 6 is a plan view of a steering wheel illustrating a convenient location of the controller means of the signaling apparatus.

Referring more particular to the drawings, wherein one embodiment of my invention is illustrated, 1 designates a bottom, 2 and 3, respectively, side and end walls, and 4 a top, of a casing wherein the various devices may be conveniently mounted, said casing being provided with brackets or suitable fastening devices 5, whereby the same may be attached to the rear of a vehicle body. The top 4 is preferably hinged, as indicated at 6 in Fig. 3, and provided with a finger-hold or other handle 7 for raising the top to give ready access to the interior of the casing for removing burnt out lamps, for repairing and renewing parts, etc.

Annunciators or indicating pointers 8 and 9, here shown to be directing hands, are mounted one on each projecting end of a pair of rock-shafts 10 and 11 journaled in the longitudinal walls 2 of the casing, equidistantly to either side of the center thereof. Each annunciator hand 8 and 9 is removably held to move with its respective rock-shaft 10 or 11 by means of nuts 12 and 13.

The annunciator hands 8 and 9 are arranged to normally occupy the position shown in full lines in Fig. 1, which is then at rest or non-indicating position, and to be actuated by means, hereinafter more fully described, to assume the horizontal position shown in dotted lines. The annunciator hand 8, carried by the rock-shaft 10, is a right hand, and when elevated to position announces that the vehicle is about to turn to the right into a cross street, as designated by the letter "R" placed in the upper right hand corner of the front wall of the casing; in like manner the hand 9 is a left hand, and when elevated to position indicates that the vehicle is to turn to the left, as may be designated by the letter "L" placed in the upper left hand corner of the casing. Both indicator hands 8 and 9 may be simultaneously actuated, when it is arbitrarily assumed that the vehicle is to be brought to a stop, as designated by the word "Stop" placed at the upper center of the casing midway between the letters "R" and "L."

Each of the rock-shafts 10 and 11 have mounted thereon rocker arms 14 and 15 provided at their free ends with slots 16 and 17, to be engaged respectively by pin connections 18 and 19 secured to the upper end of movable cores, 20 and 21, of a pair of solenoids 22 and 23 mounted within the casing and secured against accidental displacement by straps or suitable devices 24 and 25. It is to be understood that in place of the pin and slot connections, between the rocker arms and solenoid cores, any other suitable loose connection may be employed.

The solenoids 22 and 23 may be energized from any suitable source of electricity generally carried by automobiles, and for convenience in illustration I have shown in Fig. 4 a storage battery 26, connected by a battery lead and return 27 and 28, respectively, to branch circuits 29 and 30, by which the solenoids are connected in parallel. Each of the branch circuits 29 an 30 are normally open through button switches 31 and 32, which may be singly operated to close circuit through either of the solenoids 22 or 23, and consequently actuate the respective annunciator hands to indicate that the vehicle will proceed to the right or to the left, as above described. In order to effect simultaneous actuation of the annunciators to indicate a stop, the button switches 31 and 32 may be shunted by a button switch 33, arranged between a pair of conductors 34 and 35 leading respectively from the branch circuits 29 and 30, and a lead 36 connecting at the common junction 37 with the common return 28.

It will be understood from the above that operation of the button 31 will cause current to flow from the source 26 through the battery lead 27, branch circuit 29, through button 31 to the junction 37 and thence by the return 28 to the opposite pole of the source 26. The closing of this circuit energizes the solenoid 22, which draws in its core 20 against the action of a retractile spring 38, thereby rocking the arm 14 to move the shaft 10 and actuate the annunciator hand 8 to indicate proposed motion of the vehicle to the right. Similarly, operation of the button switch 32 closes the branch circuit 30, energizing the solenoid 23 which draws down its core 21 against the action of a retractile spring 39, thereby rocking the arm 15 to move the shaft 11 and actuate the hand 9 to indicate motion of the vehicle to the left.

To indicate proposed stoppage of the vehicle, the button switch 33 is depressed, which thereby connects both solenoids 22 and 23 in parallel through the shunt conductors 34 and 35 and the common lead 36, joined to the junction 37, whence the current returns to the battery through the common return 28.

Any suitable audible signal may be employed in conjunction with the annunciator signals above described, and I have illustrated an electric horn, the actuating motor 40 of which is connected in the common return 28 so that the current from either of the branches 29 or 30, or both, will traverse the windings of the same to cause sounding of the signal at each actuation of the annunciator signals.

The motor 40 may be located in any suitable position on the casing, as for instance secured to the rear longitudinal wall 2 thereof, the motor shaft 41 passing through said wall and having its opposite end journaled in the front wall where it is provided with the usual hammer bar 42, operating against the diaphragm 43 secured in the amplifier or bell 44.

It has been found that, whereas the annunciator hands form a very effective signal by daylight, the same are not accurately discernible by night, even when under the illumination of a tail or other lamp. Accordingly switches 45 and 46 are arranged to cut out the solenoid circuits 22 and 23, and lamp circuits 47 and 48 may be cut in by switches 49 and 50. The lamp circuits 47 and 48 are arranged in parallel with their respective solenoids 22 and 23, and, as will be understood from an inspection of the diagram illustrated in Fig. 4, operated through the button switches 31, 32 and 33, as above described for the solenoids.

The lamps 50' and 51 are preferably mounted on the rear wall 2 in the casing, at either extremity thereof, and in registry with openings in the front wall 2 inclosed by lenses 52 and 53 of red glass, through which the signal lights may be observed. Each of the lamps 50' and 51 have associated therewith reflector shades 54 and 55, for preventing the rays from the respective lamps from interfering with each other so as to confuse signals. The reflector shades 54 and 55 are provided with lateral perforations 56 and 57, to permit rays from the respective lamps to issue through lens-inclosed openings 58 and 59 in the end walls 3 of the casing, whereby pedestrians may be enabled to know whether the vehicle is to be driven around the corner occupied by them.

The apparatus may also contain a lamp 60 arranged in a circuit 61 connected by the battery lead and return 27 and 28, respectively, and in shunt with the signaling apparatus already described, so as not to interfere with the actuation of the same through the respective button switches. The lamp 60 in a manner similar to the lamps 50' and 51, is advantageously mounted on the rear longitudinal wall 2 within the casing, in registry with a central aperture 70 inclosed by a lens 71 of red glass, displaying the usual rear danger signal. The lamp 60 may further be employed to illuminate a number plate 72, as shown in Fig. 5, and for this purpose the bottom 1 of the casing is provided with a glass covered aperture 73 through which the rays of the lamp may pass downwardly onto the number plate 72, the same being secured to the vehicle or casing at pleasure.

A switch 62 may be employed for closing the circuit during night running, said switch, as indicated in Fig. 4, operating in the same direction with the switches 49 and 50 of the lamp circuits, and in a direction opposite to the switches 45 and 46 of the solenoid circuits, so that these various switches may be assembled in a single piece of apparatus to be mounted on the dash-board of the automobile and controlled from a single lever arm.

During night running the switches 45 and 46 are opened, and the switches 49, 50 and 62 are closed when the lamp 60 is immediately illuminated. In case a turn to the right is to be negotiated the button 31 is depressed, closing the circuit through the lamp 50' and horn 40, displaying the signal and simultaneously calling attention to the fact by the sounding of the horn. In a similar manner the lamp 51 is illuminated by depressing the button 32; and both lamps are illuminated by depressing the button 33, at each instant the circuit being closed through the motor 40 to sound a horn and notify oncoming drivers that the signal is being displayed.

I appreciate that, due to carelessness or inadvertence, drivers may fail to throw the switches at the proper time (at sundown and dawn) so as to secure the operation of the proper night or day signals, and for instance, may run long after dark on the operation of the indicator hands before discovering the fact that the signal lights have not been switched in. Accordingly the various switches 45, 46, 49 and 50 may be arranged to be permanently closed so as to actuate both the indicator hands and the signal lamps at all times; or these switches may be entirely dispensed with and the circuits for the various devices be controlled solely through the button switches.

In conjunction with the end signal lamps 50 and 51 it may be desirable to employ a central lamp 80 arranged in a circuit 81 to be closed through the button switch 33. The circuit may be interrupted through the switch 82 during daylight, if desired; or the same may be dispensed with, as indicated above, for the other lamp circuits. The lamp 80 is mounted on the rear wall of the casing directly above the tail lamp 60, and is provided with a reflector 83 similar to the reflectors 54 and 55.

In Fig. 6 is shown a steering wheel 63, on which is suitably mounted a sleeve 64 provided with a web 65, wherein the buttons 31, 32 and 33 are mounted, so as to be convenient to the left fore-finger of the driver for depressing to actuate various signals, as hereinbefore described.

I have shown and described preferred and satisfactory constructions, but desire it to be understood that changes can be made in the scope of the appended claims:

I claim:—

1. In a signaling apparatus for vehicles, the combination of a casing adapted for attachment to the vehicle and constructed with a pair of bull's-eyes, a pair of rock-shafts journaled in said casing, a direction pointer removably mounted to move with each of said rock-shafts, an arm on each of said rock-shafts, a pair of solenoids mounted in said casing operatively connected to said arms, circuits for said solenoids, means for controlling said circuits to energize said solenoids either singly or simultaneously, and a pair of lamps mounted in said casing one opposite each of said bull's-eyes and arranged to be lighted either singly or simultaneously from said circuit-controlling means, substantially as described.

2. In a signaling apparatus for vehicles, the combination of a casing adapted for attachment to the vehicle and constructed with a front wall provided with central and lateral bull's-eyes, a pair of rock-shafts journaled in said casing, a direction pointer removably mounted to move with each of said rock-shafts, an arm on each of said rock-shafts, a pair of solenoids mounted in said casing and operatively connected to said arms, circuits for said solenoids, means for controlling said circuits to energize said solenoids either singly or simultaneously, lamps mounted in said casing one opposite each of said lateral bull's-eyes and arranged to be lighted either singly or simultaneously from said circuit-controlling means, and a lamp mounted in said casing opposite the central bull's-eye and arranged to be lighted upon each simultaneous actuation of said first-named lamps, substantially as described.

3. In a signaling apparatus for vehicles, the combination of a casing adapted for attachment to the vehicle and constructed with perforated end walls and a front wall provided with central and lateral bull's-eyes, a pair of rock-shafts journaled in said casing, a direction pointer removably mounted to move with each of said rock-shafts, an arm projecting from each of said rock-shafts, a pair of solenoids mounted in said casing and operatively connected to said arms, circuits for said solenoids, means for controlling said circuits to energize said solenoids either singly or simultaneously, an audible signal carried by said casing and connected in circuit to be sounded at each closing thereof, and a plurality of lamps mounted in said casing one opposite the central bull's-eye and one opposite each of the lateral bull's-eyes and perforations in the end walls thereof and arranged to be lighted singly or simultaneously from said circuit-controlling means, substantially as described.

In testimony whereof, I affix my signature, in presence of two witnesses.

WILLIS M. VOSS.

Witnesses:
C. V. GARRIN,
NETTIE METCALFE.